United States Patent Office 3,454,396
Patented July 8, 1969

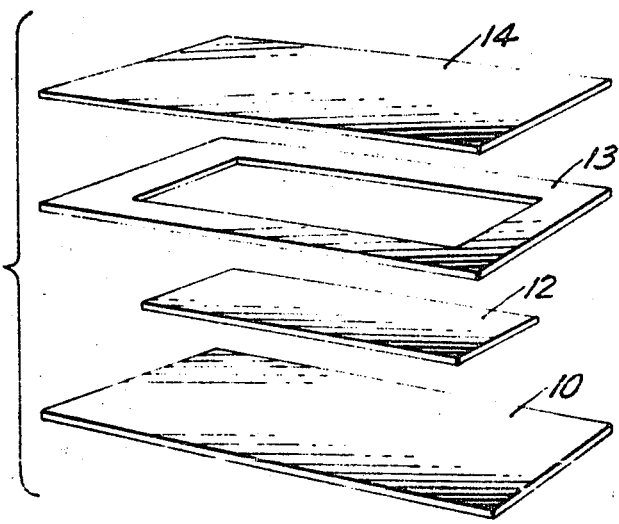
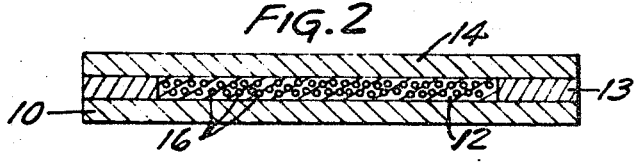
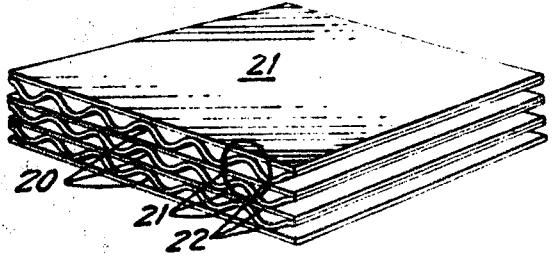 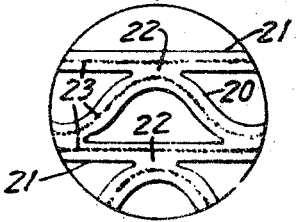
INVENTOR.
JAMES R. JOHNSON
HAROLD G. SOWMAN
BY Carpenter, Kinney & Coulter
ATTORNEYS

3,454,396
FUEL ELEMENTS
James R. Johnson, White Bear Lake, and Harold G. Sowman, Maplewood, Minn., assignors to Minnesota Mining and Manufacturing Company, St. Paul, Minn., a corporation of Delaware
Original application July 19, 1964, Ser. No. 381,411. Divided and this application Sept. 22, 1966, Ser. No. 596,033
Int. Cl. B22f 7/02; G21c 3/02
U.S. Cl. 75—208
5 Claims

ABSTRACT OF THE DISCLOSURE

A process for making nuclear fuel elements which consist of a metallic fueled matrix clad with unfueled metal, the metal matrix and cladding being united into an integral structure in which the particulate nuclear fuel is distributed in predetermined location, consisting of preparing green films or sheets of metallic powder, particulate nuclear fuel and organic binder; coating said sheet containing fissionable fuel particles with a cladding film or sheet of metallic powder and organic binder, over all of the surfaces of the fueled sheet or film, to produce a green, flexible laminate. The green laminate is then compacted slightly under enough pressure to reduce its thickness by no more than 10 percent to firmly adhere the cladding sheets and fueled sheets and to remove any voids, followed by sinter-welding of the metallic particles by firing the green laminate to sinter the metal and unify the layers of the laminate into a single, integral metallic sheet, the fissionable fuel particles being located in an inner zone of the sheet in predetermined location.

---

This application is a division of applicants' prior copending application Ser. No. 381,411, filed July 19, 1964, now abandoned.

This application relates to nuclear fuel elements and more particularly to integral, refractory metallic structures containing fissionable materials.

The use of metallic seals or barriers as protective means for nuclear fuel elements is well known and various approaches to the cladding or canning of fuel elements have been employed. These have been successful, particularly where moderate temperatures were encountered. Such clad or canned fuel elements, however, have been restricted in form and size to relatively simple shapes, generally taking the form of a cylinder or rod. Clad sheets have been made by rolling together under heavy pressure metallic sheets containing fissionable fuel enclosed in unfueled sheets. In this process the fuel particles are invariably fractured or otherwise changed from their original configuration.

The present invention makes possible relatively light weight, highly heat-resistant fuel elements and structures of complex shape, e.g., having corrugated shells, tubes and the like for insulation and cooling passages, etc. So far as we are aware, for the first time very thin-walled monolithic multiple-webbed complex corrugated structures containing fissionable fuel in predetermined shape, size and location in the structure are made possible. In these structures, the joints between the parts can be formed so as to be indistinguishable from the structure of the material surrounding the fissionable particles, which offers a considerable advantage from the standpoint of the total heat resistance of the end article, as distinguished from the weakness of heat resistance created by brazing together metal parts to form thin-walled cans and the like.

Furthermore, the fuel elements of the present invention can be of such configuration and size that they could not have been made from refractory metals by conventional methods heretofore known to the art. Thus the fuel elements of this invention may have compound curves and thin webs connecting flat sheets or plates, so as to provide for extremely efficient heat exchange with the cooling gas or liquid. Because fuel elements of niobium, tungsten, molybdenum, or other refractory metals can be made according to this invention, fuel elements can be prepared which are highly resistant to extremely high temperatures, and to the erosive effects of hot gases moving at considerable velocities.

It is an object of the present invention to provide nuclear fuel elements containing fissionable materials in particulate form distributed in a predetermined area and a predetermined configuration within relatively thin sheets or plates of metal, the said fissionable material being totally enclosed by said metal so as to be protected against corrosion, heat and gas erosion.

It is another object of the invention to provide a structural element for the construction of metallic fuel elements containing particulate fissionable materials, in extremely intricate shapes, and of homogeneous metallic grain structure throughout the completed article.

It is a further object of the invention to provide heat-resistant, integrally metal-clad, multi-passageway nuclear fuel elements, in which the webs and other structural portions are of thin cross section.

Another object of the invention is to provide a process for the production of metallic sheets containing particulate fissionable fuel uniformly dispersed in an internal zone in said sheet.

A still further object of the invention is to provide a self-supporting intermediate sheet containing particulate fissionable fuel and metal powder with a binder therefor, which is adapted to fabrication into intricate structures which can be sintered to useful high-temperature fuel elements.

Other objects of the invention will be apparent from the following disclosure.

Formation of such structures as are illustrated in the drawings, as well as related structures, is readily accomplished according to the following procedure: A plasticized raw material mix containing finely divided metallic particles (powdered metal), plasticizing and binding ingredients such as, for example, organic polymeric resins, and volatile viscosity-adjusting media is formed into a thin film or sheet material by any suitable process, e.g., knife coating, spraying, extrusion, casting, rolling and the like.

Such films may be formed as thin as desired, e.g., a mil or so, so long as the film possesses sufficient body when free of viscosity-adjusting fluids to retain its integrity after manipulation. Exceedingly thin films, however, are so delicate that they are difficult to process and handle, whereas films thicker than about ⅛ inch tend to be too bulky for convenient handling as taught herein.

To accomplish the cladding, a first film or sheet, containing metal powder and an organic binder, is made to contain embedded or uniformly dispersed therein tiny particles of a fissionable material in such a chemical embodiment that it will not react with or dissolve in the selected metal. For this purpose, actinide oxides are presently preferred, but refractory forms of the actinides, e.g., carbides, nitrides and the like may be employed, even the metals themselves being suitable in some instances.

While the shape of the particles employed is generally not critical, it is preferred to employ these fissionable actinide fuels in the form of very small spheres or generally spherical shapes, as these are stronger than irregularly shaped particles.

The green sheet thus prepared is then covered with sheets of the same or a different thickness over all of its surfaces, of a green film containing the same metal powder, binder and viscosity-adjusting media, but without any fuel particles. The sheets are adhered together as by employing a cement or slip containing metallic particles and binder in a slurry or paste form. Alternatively, the sheets can be adhered together by moistening their abutting surfaces with a solvent of the type employed in preparing the sheets, and pressing the assembled "sandwich" through rollers to unite them and eliminate air from between them.

The means used for thus forming and integrally uniting the laminates are such as to preserve at least to a substantial degree, the original isotropic character of the sheets. Thus excessive elongation on rolling is to be avoided. Simple pressing and other mechanical expedients for this purpose will be apparent to those skilled in the art.

The composite or sandwich type sheet thus formed is a green (unfired) structure, which is adaptable to further shaping or joining with other sheets or structures to make a more complex device, or it can be further treated as a sheet only. In any case, the green structure is easily formed into whatever shape is required, e.g., corrugated sheets and the like, which can be further fabricated, as disclosed herein.

Where the ridges of corrugations on one side of a corrugated film are to be welded to a plain sheet member or panel, the basic raw material mix from which the sinterable film or sheet material is formed may, diluted with organic solvents or fluids to adjust viscosity, be painted over the ridges of the corrugation as a glue media for fixing the members together. Even more simply, the abutting parts to be joined are moistened with a solvent for the binder and then pressed together; whereupon the green sheets adhere together. Once the structure dries, as by evaporation of the solvent, a temorpary, but strong bond between the parts of the structure is formed, which, after firing, becomes a strong and rigid weld. Alternatively other means of making temporary bonds, such as, for example, heat sealing may be employed.

Where solvent is employed in the bonding operation, the completed structural article is permitted to dry so as to substantially remove volatile solvents or organic fluids from its joints. The green structures thus formed are strong enough to handle and even can be trimmed, smoothed or otherwise manipulated. Then the structures are heat unified by using temperatures suitable for sintering of the particular sinterable ingredients of the structure, as is well understood in the powdered metal art.

In preparing the structures, procedures which would cause segregation of particles in any particular way, as, for example, aligning the axes of particles or grains or changing the uniform character of their distribution, are avoided or compensated for by appropriate treatment to restore uniformity. As a result, the green, unfired structures are essentially isotropic in nature. Consequently, upon firing, they shrink substantially equally in all directions, resulting in a structure which is substantially free from warping and internal strain.

The final metallic structure which is produced is essentially an integral metal sheet or plurality of sheets and webs containing uniformly dispersed in predetermined location within an inner zone of each sheet particles of a fissionable fuel, these particles being surrounded by an outer zone which is free from the fuel particles and which constitutes an integral cladding; the metal portion of the sheet is further characterized by having homogeneous metallic grain structure and being unworked mechanically. The fissionable particles are of their original size and shape because the procedures used to produce the green structures, even of the most intricate configuration, do not damage or alter the particles.

These characteristics of the product of the invention are very advantageous. The structures are extremely heat resistant from the standpoint of warping. The nuclear fuel particles are positioned within the sheets at known and selected locations, and in predetermined distribution. They are coated and protected from their environment by an integral cladding, which permits the best possible heat transfer. They are strong, and no part of the structure is weakened by a joint, whether welded or soldered, which is of a different material or of different metallic grain structure.

The principles of this invention may be used to advantage to form nuclear fuel elements out of sinterable, refractory, relatively high-melting metals such as, for example, tungsten, molybdenum, chromium, titanium, zirconium, vanadium, niobium, tantalum, iron, nickel, and alloys of such metals which exhibit properties useful in nuclear reactors. Stainless steel, for example, is a very useful alloy where moderate temperatures are encountered.

For the purposes of this invention, the term "refractory" will be understood to include the named metals and alloys and their equivalents. These metals melt above about 1300° C.

A variety of organic binders can be employed in the formation of the flexible (plastic) green sinterable films and sheet members used to fabricate the nuclear fuel elements according to this invention. Thermosetting or thermoplastic, high molecular weight plastics or elastomers can be used, e.g., polyvinyl type resins such as polyvinyl chloride, polystyrene, polyvinyl acetate, polymethyl methacrylate, polyvinyl ethyl ether, polyvinyl octyl ether, and the like; polyesters such as poly-diethylene glycol adipate, polyethylene glycol terephthalate, poly-1,4 butylene glycol sebacate, poly-2,2 dimethyl 1,3 propane diol adipate, and the like; polyesters crosslinked with diisocyanates, phenol formaldehyde resins, melamine resins, urea-formaldehyde resins, poly-ethylene, fluorinated alkyl acrylate-type resins such as poly-1,1-dihydroperfluorobutyl acrylate, and the like; poly-vinylidene fluoride, copolymers of the monomers of the above (and other) resins, elastomers such as polystyrene-butadiene, nitrile rubbers, butyl rubbers, and the like; water soluble binders such, as methyl cellulose, polyvinyl alcohols, and the like.

In some cases, it is useful to employ a plasticizer with certain resin systems in order to improve the flexibility and workability of the solvent-free film. With other resin systems, no plasticizer is commonly needed, and in fact some polymers may be said to be internally plasticized (e.g., poly-acrylate esters of long chain alcohols).

Wetting agents may be employed in small quantities, to assist in the dispersion of the metallic particles in the binder. The solvents which are employed to impart lower viscosity to the binder-metal powder mixtures to reduce the viscosity so that sheets and other structures can be made can of course be organic solvents or water or aqueous solvents. Preferably, the various ingredients of the binder system are chosen so as to be compatible with each other.

The amount of polymeric binder which is employed can be relatively small. Amounts ranging from 1 to 10 weight percent and preferably from 1 to 5 weight percent of organic binder, based on the weight of metal used, are employed. In the firing of the green articles, the sheets or other structures which have been stabilized by removal of a major part of the solvent therefrom are first heated to render them completely solvent-free, then prefired at a temperature which will volatilize or decompose the binder, followed by firing in an inert atmosphere or in a hydrogen atmosphere, to prevent oxidation of the metal and to assist in removal of any remaining traces of binder or its decomposition products. When the metals used can be fired in wet or dry hydrogen without the formation of hydrides, which cause undesirable embrittlement, either fugitive (volatilizable, non-carbonizing) or heat decomposable binders are useful. When the metals form hydrides under conditions of firing in hydrogen, fugitive binders are employed and the firing is carried out in vacuo or in inert gases.

Structural aspects and features of the sintered nuclear fuel elements of this invention will be further described and illustrated by reference to a drawing, made part hereof, wherein:

FIGURE 1 is an exploded view of an assembly of green sheets;

FIGURE 2 is a cross-sectional view through a stacked assembly as in FIGURE 1, showing the green sheets with unfueled portions completely surrounding the fueled portions;

FIGURE 3 is a cross-sectional view of the stacks of FIGURE 2 after firing;

FIGURE 4 is a perspective view of an assembled, sintered laminate of corrugated sheets between thin flat sheets, forming a unit for use in a fuel element adapted for gas cooling; and FIGURE 5 is an enlargement of the encircled portion of FIGURE 4.

Referring to FIGURE 1, there is shown a thin film 10 constituting a base, a similar thin film 12 of smaller area, in which is dispersed particulate fissionable actinide fuel, a sheet 13 having an aperture corresponding to the fueled sheet 12 and equal in surface area to sheet 10; while sheet 14 is identical with sheet 10 and forms a cover over the assembly. When assembled, using as a glue medium between the sheets and the edges of sheet 12 and the aperture in sheet 13 the basic raw material mix from which the sheet material of base 10 or cover sheet 14 was made, diluted with organic solvents or fluids to adjust the viscosity to that of a thin cement, the whole assembly is temporarily welded together into a single unit.

In FIGURE 2, there is shown in cross-section such a temporarily bonded unit as is produced from the assembly in FIGURE 1. The thickness of the sheets is exaggerated for clarity. The joints between the pieces are normally invisible after the solvent has evaporated, and they are shown here only to indicate the original location of the parts.

In FIGURE 3, the sandwich of FIGURE 1 is shown in cross-section after firing. Again, the dimensions are exaggerated. The fuel particles are shown as small spheres, although as set forth hereinabove, irregularly shaped particles can be used if desired. The entire unit has been sintered into an integral, homogeneous metal matrix, in which there are dispersed in their original positions in the laminate, the fuel particles 16.

FIGURES 4 and 5 are exemplary of a structural fuel element utilizing corrugated films. The corrugated films 20 of the illustrative structure are separated from each other by, and sinter-welded to, thin plate members 21. The weld zone 22 is illustrated in FIGURE 5 (unfueled cladding material removed from the ends of the sheets). It will be observed that the zone is undetectable, being essentially free of any demarcation line or juncture between corrugated films 20 and plates 21, indicating that the corrugated film and plate are well fused or coalesced together and that the grain of the metal in the structure is substantially homogeneous throughout.

As used herein, the terms "weld" and "sinter-weld" mean fastened together by a thermal-rigidification step, including the step of sintering contacting portions of films or sheets together using only materials having the composition of the films or sheets themselves. Preferably, the weld area between ridges of corrugations and other sheet members, or between the parts of structures made utilizing other configurations of sheets, is formed by thermal unification of temporary bonds formed using constituents or ingredients common to the sheet members to be joined (or common to the surface layer composition of sheet members to be joined which contain nuclear fuel particles) as illustrated in the examples, so that the final fired articles are of monolithic structure in that the metal of the joints (e.g., see FIGURE 5) cannot be separated and identified from the material of the contacting surfaces of the sheet members themselves. Such structural articles have bonds equal in thermal stability to the sheet members joined.

It should be noted that FIGURE 5 represents the structure with cladding removed from the ends of the sheets, to show the fissionable material dispersed sandwich style in the metal corrugations and flat sheets. Dotted area 23 indicates the fuel particles.

The invention is further described and illustrated by the following examples, in which all parts are by weight unless otherwise specified.

Example 1

A basic plastic raw material mix is prepared consisting of 48.5 parts of molybdenum powder (−325 mesh), 5 parts of a tetrapolymer, and about 20 parts of a solvent mixture consisting of 22.1% ethyl acetate, 38.9% Cellosolve acetate, and 38.95% nitroethane. The tetrapolymer consists of about 30% by weight octadecyl acrylate, 30% acrylonitrile, 35% cyclohexyl acrylate, and 5% acrylic acid copolymerized in ethyl acetate. It is in the form of an organosol and a sufficient amount of Cellosolve acetate and nitroethane are added to produce the solvent mixture specified above.

The slurry is then mixed for about 18 hours in a rotating jar mill so as to gain a uniform blend. The blended slurry is coated at a thickness of about 25 mils on a low adhesion surface, i.e., polyethylene coated paper, and the coating allowed to partially dry (e.g., to dry until only about 20% of the solvent remains in the film). The resulting thickness is about 10 mils. A second 10-mil thick layer consisting of the same raw material slurry as used for the first layer, but in addition containing approximately 5 parts of enriched uranium oxide fuel (the uranium being essentially U-235), is then knife-coated over the patrially dried first layer and also allowed to partially dry (i.e., to about 20% solvent retention). Finally, a third layer is knife-coated over the second layer, the third layer also being 10 mils thick after drying and consisting solely of the same basic raw material mix as used for the first layer. The entire laminate is dried in air at room temperature, the final dried thickness being on the order of about 25–30 mils.

The dried laminate is lifted from the polyethylene coated paper and about half of the laminated strip placed upon a 10-mil aluminum foil. The aluminum foil and the laminate are passed together through a corrugating apparatus, the rolls of which are at about 270° F. and provide about 8 corrugations of 50 mils amplitude per inch.

The portion of the laminate of this example not corrugated is painted or sprayed on one side with a thin coating of a slurry consisting of the basic raw material mix of this example, and then placed with its coated side against the exposed ridges of the corrugations of the corrugated film. The solvent from the coated slurry penetrates slightly into the surface portions of the ridges of the contacting corrugations and then evaporates at room temperature. Squares are cut from the resulting assembly sheet consisting of corrugated film and flat sheet material, and the squares stacked to form the article illustrated in FIGURE 4, with the exposed portions of the flat sheet material of each assembly sheet being painted or sprayed with a thin coating of the basic raw material mix of this example so as to glue the composite structure together at points of contact between the ridges of corrugations and the flat sheet members. Exposed edges of the sandwich sheet members are thickly coated with the basic raw material mix to seal in the fuel. The composite article resulting is then allowed to dry at room temperature and fired in an inert atmosphere (e.g., a hydrogen atmosphere) using a 16½ hour firing cycle and a maximum soak temperature of about 1750° C., maintained for about ½ hour in the middle of the firing cycle. The resulting composite sintered metallic structure is useful as a clad fuel element in atomic reactors.

Improved strength is obtained, with increased density of the metal, by decreasing the amount of binder used in the green sheets to about 2–3 parts for 100 parts of molybdenum.

Example 2

A mixture of 20 parts of uranium oxide, ceramic grade, in the form of shot about 50 to 75 microns in diameter, and 151.2 parts of tungsten powder (−325 to −400 mesh) is thoroughly mixed in dry form together with about 8 parts of powdered methyl cellulose (4000 c.p.s.), in a tumbling blender. To the mixture is added 17 ml. of water and 8 drops of glycerin, and the wet mixture is mixed for about 20 minutes. The resulting wet but plastic mass is rolled into sheets approximately 25 mils thick. The rolled sheet thus formed is dried as between weighted, smooth-surfaced sheets, the surface of which has been treated by spraying with a release agent to prevent sticking. When precision parts are to be made, the green sheets are preferably dried while weighted down with polished metal sheets. Vacuum drying is advantageous. The dried sheet is prefired in hydrogen at 550° C. to burn out the binder. The sheet then is sintered in vacuum ($10^{-4}$ mm. Hg), using a firing schedule as follows: 25 minutes bake-out at 700° C.; 10 minutes hold at 1600° C.; 10 minutes hold at 2125° C.; followed by cooling. Microscopic examination of the sheet after sintering shows a well-crystallized dense sheet.

For predetermined location of the fuel zone in the sheet, green sheet configurations are made containing about 95 parts of −325 to −400 mesh tungsten powder (containing 2 more percent of nickel as a sintering aid), and 5 parts of methyl cellulose powder (4000 c.p.s.). This is thoroughly mixed and then sufficient water (.50 or more parts) and about 1 part of glycerin as a plasticizer are added to permit formation of a sheet after thorough mixing. The sheet is rolled to about 10 mils thickness, while still moist, and cut to pieces approximately 2 x 3 inches in size. A centrally located aperture approximately 1 x 2 inches in size is cut into some of the sheets. While still wet, the sheets are stacked by placing an apertured sheet on one of the plain sheets, and placing in the aperture a green, wet 10 mil thick fueled sheet cut to fit the aperture and containing 10% $UO_2$ shot, as prepared above; and over this is laid another plain sheet. The assembly is passed between rolls at a pressure sufficient to reduce the total thickness about 5–10%. The clad green sheet thus produced is carefully dried to eliminate the moisture, restraining the laminate from warping. It is then baked at 500° C. for about 30 minutes and fired at 1750° C. in a wet hydrogen furnace for about 10 minutes.

Example 3

A mixture of 400 parts of tungsten (−425 mesh), 16 parts of methyl cellulose (60 hg. 4000 c.p.s.), thoroughly blended while dry, is mixed with 20 parts of water and 7 parts of glycerin, together with a small amount of wetting agent (e.g., an alkyl ether of polyethylene glycol). After thorough mixing, the wet mixture is rolled on a rubber mill set at 2 mils opening. The sheet formed is cross rolled, i.e., after formation, it is rolled at a direction 90° to the direction used for formation. The very thin sheet thus formed, of approximately 9 mils thickness, is kept moist. A previously prepared green sheet of the same composition and thickness, except that it contains 30 mole percent of 100–140 mesh uranium oxide shot, is cut to a size less than one-half that of the unfueled tungsten sheet. While keeping the sheets wet, the fueled sheet is laid on the unfueled sheet, which is then folded over so as to enclose the fueled sheet within the unfueled cladding. The green assembly is carefully pressed together to eliminate air pockets, and the edges are sealed together by slight pressure. This composite sheet is then passed between calendar rolls under pressure to bond the cladding to the fueled sheet. To maintain isotropic properties, the sheets are cross-rolled, i.e., a subsequent pass at 90° to the direction of the original pass, using a roll setting of about 12 mils, a final thickness of about 20 mils is obtained. Preferably, however, the reduction of thickness is about 5–10%. If necessary, large or excessive overlaps of the unfueled cladding are cut off.

The composite sheet thus formed can be corrugated as in Example 1, and a number of such sheets, for example, alternately flat and corrugated, can be assembled into a structure having numerous parallel passageways. A cement consisting of tungsten powder, methyl cellulose and water is used to bond the sheets where they touch. Alternatively, the dry, leathery green sheets are merely wetted with water where they are to be joined. When put together with slight pressure, the sheets adhere together and on drying a strong green bond is formed.

Structures thus formed are carefully dried, then baked at about 500° C., in hydrogen, and fired in wet hydrogen at a temperature of the order of about 1750° C.

Both fueled and unfueled (cladding) sheets are made by the process of Examples 2 and 3, using molybdenum, niobium, tantalum, zirconium, and the like. Likewise, alloys, such as stainless steel, can be employed. In each case, powdered metal of the order of −325 mesh is employed. When stainless steel powder is used, the dried sheets are fired at about 1350° C., in a hydrogen furnace, after baking for about 30 minutes at 500° C.

When metals are used which form hydrides upon firing in hydrogen, such as titanium, zirconium, tantalum, etc., a fugitive binder is employed and firing is carried out in an inert atmosphere. Thus, for example, finely powdered (−325 mesh) tantalum is admixed with 3% of powdered methyl methacrylate, with an organic solvent therefor. Fueled and unfueled sheets are made as set forth above, and are assembled in the same way using the selected solvent. On firing to a temperature of about 2100° C. in an argon atmosphere for about 20 minutes, after preliminary baking in vacuum ($10^{-4}$ mm. Hg) for about one hour at about 300° C., unworked, isotropic sheets of tantalum containing $UO_2$ fuel particles are produced.

What is claimed is:
1. The process for producing metal-clad nuclear fuel elements, which comprises the steps of
   (1) preparing flexible, uncompacted, green fueled films or sheets of predetermined size and thickness consisting essentially of a mixture of finely divided metallic powder having dispersed uniformly therein particles of fissionable actinide-containing nuclear fuel, an organic binder for said metallic powder and solvent for said binder;
   (2) preparing flexible, uncompacted green cladding films or sheets consisting of a mixture of finely divided metallic powder, organic binder for said metallic powder and solvent for said binder;
   (3) adhering cladding film or sheet over all of the surfaces of said fueled film or sheet by means of the solvent for said binder or by means of a paste or slurry of a mixture of metallic powder and organic binder therefor in a solvent for said binder, and employing not greater than slight pressure, to form a laminate;
   (4) subjecting the said green laminate to the action of compacting means to eliminate voids between sheets of said green laminate and to uniformly reduce the thickness of said green laminate by not more than 10 percent of the original thickness;
   (5) removing solvent from said green laminate; and
   (6) firing said green laminate to effectively remove the organic binder therefrom and to sinter-weld the metallic powder to an integral metallic matrix containing nuclear fuel particles uniformly distributed in predetermined amount and location therein.

2. The process for producing metal-clad nuclear fuel elements, which comprises the steps of (1) preparing flexible, uncompacted, green fueled sheets of predetermined size and thickness, consisting of a mixture of finely divided metallic powder having dispersed uniformly therein particles of fissionable actinide-containing nuclear fuel, an organic binder for said metallic powder and solvent for said binder;

(2) preparing flexible, uncompacted green cladding sheets consisting of a mixture of finely divided metallic powder, organic binder for said metallic powder and a solvent for said binder;

(3) adhering cladding sheet over all of the surfaces of said fueled sheet by means of the solvent for said binder or by means of a paste or slurry of a mixture of metallic powder and organic binder therefor in a solvent for said binder, and employing not greater than slight pressure, to form a green laminate;

(4) subjecting the green laminate to the action of compacting means to eliminate voids between sheets of said green laminate and to uniformly reduce the thickness of said green laminate by not more than 10 percent of the original thickness;

(5) removing solvent from said green laminate; and (6) firing said green laminate to effectively remove the organic binder therefrom, and to sinter-weld the metallic powder to an integral metallic matrix containing nuclear fuel particles uniformly distributed in predetermined amount and location therein.

3. The process according to claim 1 in which the metal is molybdenum.

4. The process according to claim 1 in which the metal is tungsten.

5. The process according to claim 1, in which the green laminate is fabricated into a green structure prior to firing.

References Cited

UNITED STATES PATENTS

| | | | |
|---|---|---|---|
| 2,165,027 | 7/1939 | Bitter | 204—1 |
| 2,431,691 | 12/1947 | Newman | 72—214 |
| 2,986,504 | 5/1961 | Goslee | 29—400 |
| 3,028,656 | 4/1962 | Herbert. | |
| 3,088,892 | 5/1963 | Cain | 176—69 |
| 3,150,973 | 9/1964 | Storchheim | 75—208 |
| 3,161,701 | 12/1964 | Johnson | 176—69 X |
| 3,177,578 | 4/1965 | Barr | 176—69 X |
| 3,186,871 | 6/1965 | Donohue | 75—222 X |
| 3,206,846 | 9/1965 | Slayter | 29—420.5 X |
| 3,323,879 | 6/1967 | Kerstetter | 75—208 |

OTHER REFERENCES

Leszynski—"Powder Metallurgy," Interscience Publishers, 1961, p. 549.

BENJAMIN R. PADGETT, Primary Examiner.

A. J. STEINER, Assistant Examiner.

U.S. Cl. X.R.

75—214; 176—67